United States Patent
Tsujita

(10) Patent No.: US 6,967,571 B2
(45) Date of Patent: Nov. 22, 2005

(54) TIRE CONDITION MONITORING APPARATUS

(75) Inventor: Yasuhisa Tsujita, Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 129 days.

(21) Appl. No.: 10/694,381

(22) Filed: Oct. 27, 2003

(65) Prior Publication Data
US 2004/0090322 A1 May 13, 2004

(30) Foreign Application Priority Data
Nov. 12, 2002 (JP) .............................. 2002-328608

(51) Int. Cl.$^7$ .............................................. B60C 23/00
(52) U.S. Cl. .................... 340/447; 73/146.5; 116/34 R
(58) Field of Search ............................... 340/442–449; 73/146, 146.2, 146.3, 146.8, 146.4; 116/34 R, 116/34 A, 34 B; 254/93 R, 93 VA

(56) References Cited

U.S. PATENT DOCUMENTS

| | | | |
|---|---|---|---|
| 3,835,451 A | * | 9/1974 | Church ........................ 340/447 |
| 6,204,758 B1 | | 3/2001 | Wacker et al. |
| 6,323,765 B1 | * | 11/2001 | Horie et al. ................. 340/442 |
| 6,463,798 B2 | * | 10/2002 | Niekerk et al. ............. 73/146.2 |
| 6,518,877 B1 | * | 2/2003 | Starkey et al. .............. 340/447 |
| 6,591,671 B2 | * | 7/2003 | Brown ....................... 73/146.5 |

FOREIGN PATENT DOCUMENTS

| | | |
|---|---|---|
| EP | 1 078 779 A2 | 2/2001 |
| EP | 1 205 317 A2 | 5/2002 |
| GB | 2 344 232 A | 5/2000 |
| JP | 2001-56263 A | 2/2001 |

* cited by examiner

Primary Examiner—Jeffery Hofsass
Assistant Examiner—Jennifer Stone
(74) Attorney, Agent, or Firm—Crompton, Seager & Tufte, LLC

(57) ABSTRACT

A tire condition monitoring apparatus that improves data communication accuracy. Permanent magnets are fixed to the wheel well. A transmitter fixed to a tire includes a pressure sensor for detecting the air pressure of the tire and an MI sensor for detecting magnetic fields generated by the permanent magnets. As the tire rotates, the positions of the permanent magnets relative to the MI sensor change. Thus, the intensity of the magnetic field acting on the MI sensor changes. The transmitter determines the rotation angle of the tire based on the detection of the MI sensor. When the rotation angle of the tire is in a range optimal for wireless communication, the transmitter transmits the air pressure data generated by the pressure sensor.

17 Claims, 5 Drawing Sheets

TIRE CONDITION MONITORING APPARATUS

BACKGROUND OF THE INVENTION

The present invention relates to a tire condition monitoring apparatus, and more particularly to a wireless communication type tire condition monitoring apparatus that enables a driver to monitor the air pressure of a vehicle tire from the passenger compartment.

Japanese Laid-Open Patent Publication No. 2001-56263 describes a wireless communication type tire condition monitoring apparatus for monitoring the condition of a plurality of vehicle tires from the passenger compartment. The monitoring apparatus includes a transmitter arranged in each tire of an automobile to transmit a signal indicating the air pressure of the tire, a receiver for receiving the signal, and a display for informing the driver of the automobile of the air pressure condition of each tire. The receiver includes a plurality of receiving antennas and a synthesizer for outputting a maximum one of the voltages induced in the antennas. When the induction voltage of each receiving antenna is less than the minimum detectable voltage of the receiver, a synthesizer for complementing the induction voltage with another induction voltage that is greater than the sensitivity voltage is necessary. As a result, the tire condition monitoring apparatus of Japanese Laid-Open Patent Publication No. 2001-56263 has a complicated structure.

SUMMARY OF THE INVENTION

It is an object of the present invention to provide a tire condition monitoring apparatus that communicates data with a simple structure.

To achieve the above object, the present invention is a tire condition monitoring apparatus for monitoring the condition of a tire of a vehicle. The tire condition monitoring apparatus includes a transmitter arranged in the tire, a receiver for performing wireless communication with the transmitter, a magnetic field generator arranged in the vehicle near the tire to generate a magnetic field, and a magnetic field detector arranged in the transmitter to detect the magnetic field. The transmitter determines rotation angle of the tire in accordance with the detection of the magnetic field detector to transmit data indicating the condition of the tire based on the rotation angle.

A further aspect of the present invention is a method for monitoring a tire condition in a vehicle including a tire mounted in a wheel well. The method includes arranging a transmitter in the tire to generate a wireless radio wave, arranging a receiver in the vehicle for performing wireless communication with the transmitter, with the receiver including a receiving antenna for receiving the wireless radio wave of the transmitter by wireless radio wave causing an induction voltage to be generated in the receiving antenna, fixing a plurality of permanent magnets at a plurality of positions in the wheel well, arranging a magnetic field detector in the transmitter for detecting a magnetic field that acts on the transmitter, determining the rotation angle of the tire at which the induction voltage becomes less than a minimum detectable voltage of the receiver, detecting the rotation angle of the tire in accordance with the detection of the magnetic field detector, transmitting data indicating the condition of the tire when the rotation angle of the tire is in a predetermined range that excludes the determined rotation angle, and receiving the data and displaying the condition of the tire in accordance with the received data.

A further aspect of the present invention is an apparatus for monitoring the condition of a tire mounted in a wheel well of a vehicle. The apparatus includes a plurality of permanent magnets fixed to the wheel well and a transmitter fixed to the tire. The transmitter includes a pressure sensor for detecting the air pressure of the tire, a magnetic impedance sensor for detecting electric fields generated by the plurality of permanent magnets, and a transmitter controller for determining rotation angle of the tire based on the detection of the magnetic impedance sensor and for transmitting air pressure data generated by the pressure sensor when the rotation angle of the tire is in a range optimal for wireless communication. A receiver is arranged in the vehicle to receive the air pressure data.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to a preferred embodiment of the present invention will now be discussed.

Figure 1:
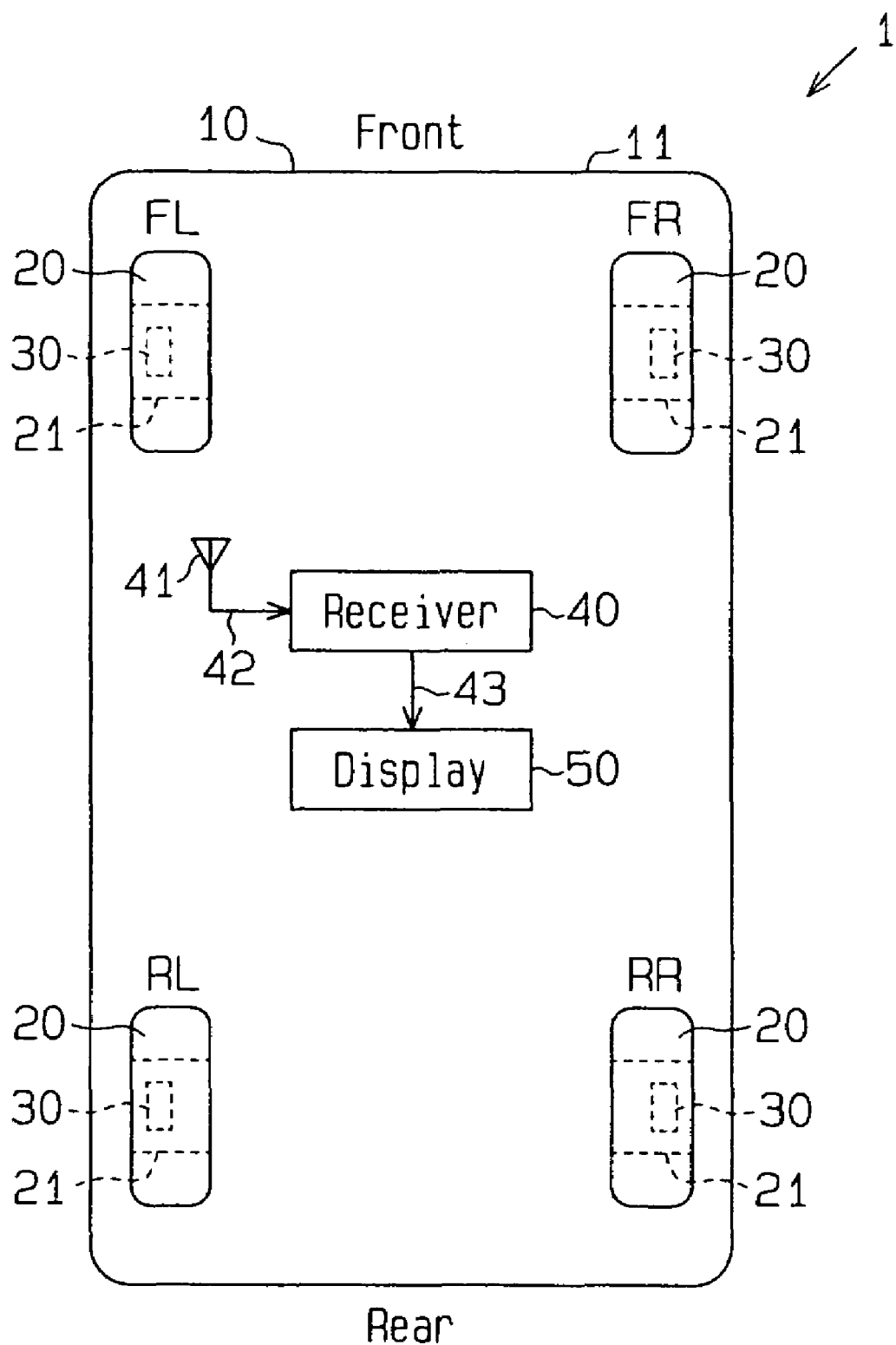
FIG. 1 is a block diagram showing a tire condition monitoring apparatus.

As shown in FIG. 1, the tire condition monitoring apparatus 1 includes four transmitters 30, each arranged in one of four tires 20 of a vehicle 10. The four tires 20 are located on the front left side (FL), the front right side (FR), the rear left side (RL), and the rear right side (RR) of the vehicle 10. Further, the tire condition monitoring apparatus 1 includes a receiver 40, which is arranged in the body 11 of the vehicle 10.

It is preferred that each transmitter 30 be arranged inside the associated tire 20 in a state fixed to a tire wheel 21. The transmitter 30 measures the condition, or the air pressure and inner temperature of the associated tire 20, and transmits the measured result (air pressure information and temperature information) in a wireless manner.

The receiver 40 is installed at a predetermined location of the body 11 and operated, for example, with the power from a battery (not shown) of the vehicle 10. The receiver 40 includes a receiving antenna 41 which is connected to the receiver 40 by a cable 42. The cable 42 is preferably a coaxial cable that is hardly affected by noise. The receiver 40 receives data, which is transmitted from each transmitter 30, via the receiving antenna 41.

A display 50, or an informing device, is arranged within the visual range of the driver of the vehicle 10 (preferably, in the passenger compartment). The display 50 is connected to the receiver 40 by a cable 43.

Figure 2:
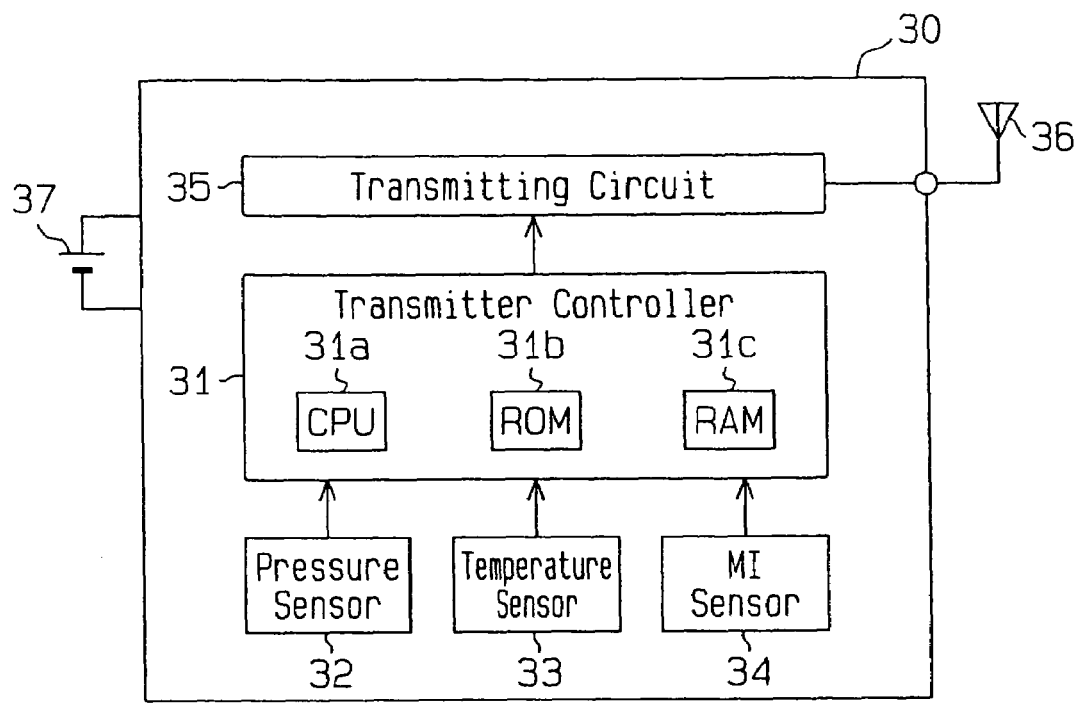
FIG. 2 is a block diagram showing a transmitter.

As shown in FIG. 2, each transmitter 30 includes a transmitter controller 31. It is preferred that the transmitter controller 31 be a microcomputer that includes, for example, a central processing unit (CPU) 31a, a read only memory (ROM) 31b, and a random access memory (RAM) 31c. The transmitter controller 31 has a distinctive ID code registered in an internal memory, such as the ROM 31b. The receiver 40 uses the Id code to identify the transmitter 30.

In each transmitter 30, a pressure sensor 32 measures the air pressure of the associated tire 20 to generate air pressure information in accordance with the measuring result and provide the transmitter controller 31 with the air pressure information. A temperature sensor 33 measures the temperature inside the associated tire 20 to generate temperature information in accordance with the measuring result and provide the transmitter controller 31 with the temperature information. A magnetic impedance sensor (MI sensor) 34 is a semiconductor magnetic sensor of which magnetic impedance changes greatly in accordance with the magnitude of an external magnetic field. The MI sensor 34 generates a magnetic detection signal in accordance with the level of magnetic impedance and provides the transmitter controller 31 with the magnetic field detection signal.

The transmitter controller 31 provides the air pressure information, the temperature information, and the registered transmitter controller ID code to a transmitting circuit 35. The transmitting circuit 35 transmits data, which includes the air pressure information, the temperature information, and the ID code, to the receiver 40 through a transmitting antenna 36 in a wireless manner. The transmitter 30 includes a battery 37, which supplies operational power.

Figure 3:
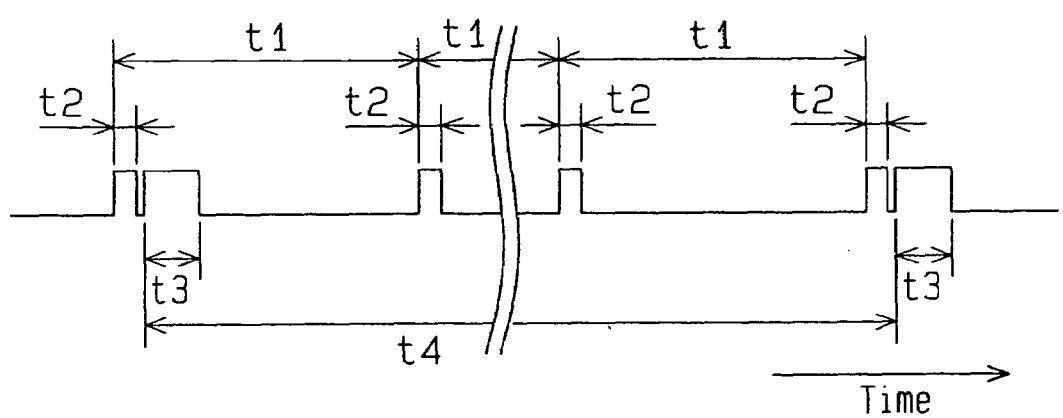
FIG. 3 is a timing chart illustrating the operation of the transmitter.

As shown in FIG. 3, the transmitter controller 31 normally has the pressure sensor 32 and the temperature sensor 33 perform measuring at predetermined measuring time intervals t1 (e.g., 15 second intervals). In FIG. 3, measuring time t2 is the time from when the pressure sensor 32 and the temperature sensor start measuring to when the transmitter controller 31 starts processing the data including the measuring results.

Further, transmission time t3 is the time during which the transmitting circuit 35 performs a transmission. Accordingly, the transmitter 30 does not consume the power of the battery 37 during periods other than the measuring time t2 and the transmission time t3.

The transmitter controller 31 counts the number of measurements taken by the pressure sensor 32 and the temperature sensor 33. Whenever the measurement number reaches a predetermined number (e.g., 40), the transmitter controller 31 has the transmitting circuit 35 perform transmission. When the predetermined measurement number is 40 and the measuring time interval t1 is 15 seconds, the transmitter controller 31 has the transmitting circuit 35 perform transmission every 10 minutes (15 seconds×40). In other words, the predetermined measuring number and the measuring interval t1 determine a transmission interval t4.

The measuring interval t1 and the transmission interval t4 are determined from, for example, the capacity of the battery 37, the power consumption of the transmitter 30, the measuring time t2 of the transmitter 30, and the transmission time t3. It has been confirmed that the life of the battery 37 is ten years or longer when the capacity of the battery 37 is 1000 mAh, the measuring interval t1 is 15 seconds, and the transmission interval t4 is 10 minutes.

The transmitter controller 31 monitors the rotation angle of the associated tire 20 (i.e., the position of the transmitter 30) based on the magnetic field detection signal of the MI sensor 34. When the rotation angle is in the optimum wireless communication range, the transmitter controller 31 has the transmitting circuit 35 perform transmissions at every transmission interval t4 (normal mode).

Figure 4:
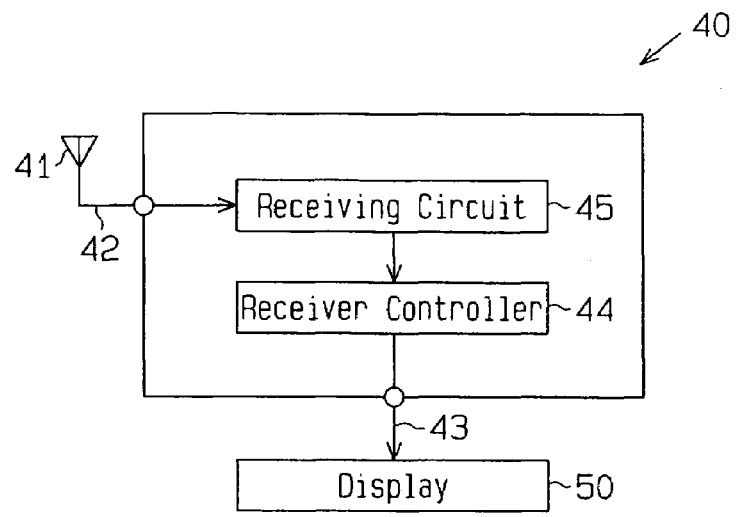
FIG. 4 is a block diagram showing a receiver.

As shown in FIG. 4, the receiver 40 includes a receiving circuit 45, which is connected to the receiving antenna 41, and a receiver controller 44, which processes the received data. The receiver controller 44 is a microcomputer including, for example, a CPU, a ROM, and a RAM. An internal memory of the receiver controller 44, such as the ROM, stores tire position information for determining the position of the tire 20 on the vehicle 10. The receiving circuit 45 receives data from the transmitters 30 through the receiving antenna 41, demodulates and decodes the received data, and provides the decoded data to the receiver controller 44.

The receiver controller 44 extracts the air pressure and temperature of the tire 20 associated with the transmitter 30 from which the decoded data originated. The display 50 shows the data related with the air pressure and the temperature. For example, when the air pressure of the tire 20 is abnormal, the display 50 shows a warning indication. The receiver controller 44 determines the tire 20 of the transmitter 30 from which the received data originated. This enables the display 50 to indicate the tire for which air pressure is abnormal. It is preferred that the receiver 40 be activated when the vehicle is operated, for example, when operating an ignition key.

Figure 5:
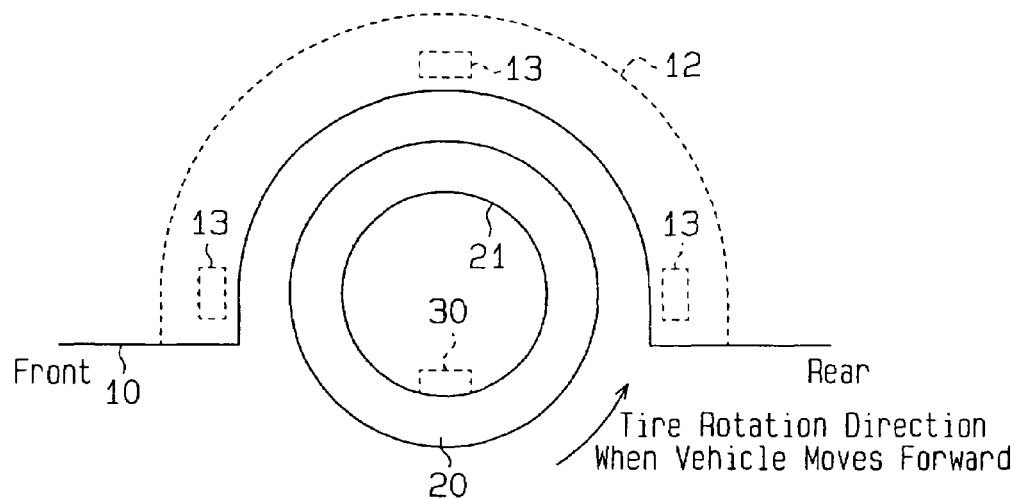
FIG. 5 is a schematic diagram illustrating the positional relationship between the transmitter and permanent magnets.

As shown in FIG. 5, a magnetic field generator consisting of magnetic field generating elements 13 is arranged in each wheel well 12 of the vehicle 10. The magnetic field generating elements 13 are preferably permanent magnets or electromagnets. In the preferred embodiment, permanent magnets 13 are used. The permanent magnets 13 are arranged at a number of predetermined positions in each wheel well 12. In the front left (FL) wheel well 12, three permanent magnets 13 are arranged at angular intervals of 90 degrees. In the other wheel wells 12, three permanent magnets 13 are arranged at angular intervals excluding 90 degrees. It is preferred that the layout (angular intervals) of the permanent magnets 13 differ from one another in the four wheel wells 12.

Figure 6:
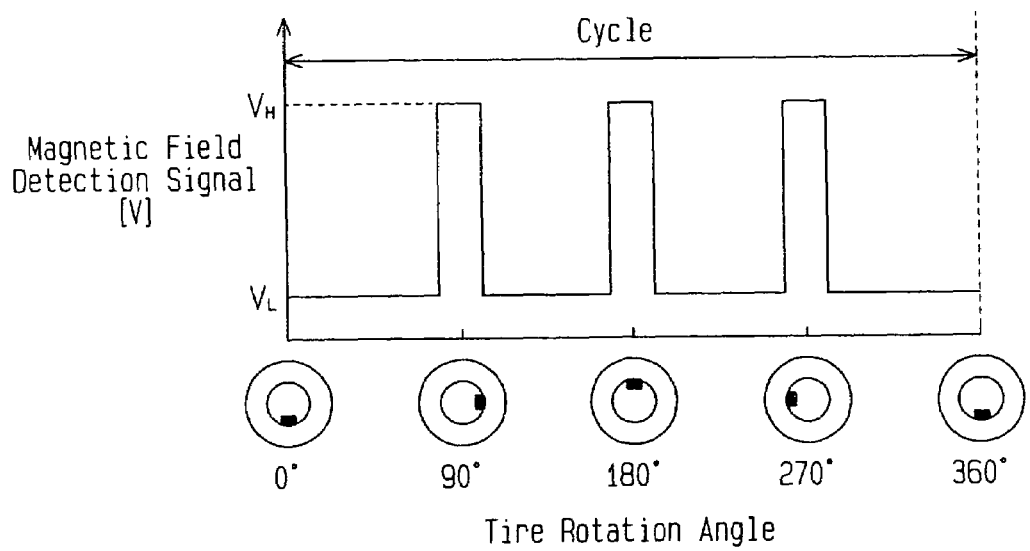
FIG. 6 is a schematic diagram illustrating a magnetic field detection signal generated by an MI sensor.

Each transmitter 30 includes the MI sensor 34 to detect the magnetic fields of the permanent magnets 13. When the vehicle 10 is moving and the associated tire 20 is rotating, the position (distance) of the permanent magnets 13 relative to the MI sensor 34 changes. As the intensity of a magnetic field detected by the MI sensor 34 changes, the magnetic field detection signal of the MI sensor 34 changes. The transmitter 30 determines the rotation angle of the tire 20 from the magnetic field detection signal of the MI sensor 34. FIG. 6 illustrates the relationship between the tire rotation angle and the magnetic field detection signal. When the magnetic field detection signal of the MI sensor 34 is an analog signal, a digital signal is generated from the magnetic field detection signal with a predetermined threshold value to obtain a magnetic field detection signal that has the waveform shown in FIG. 6. When the magnetic field detection signal is a digital signal, the signal has the waveform shown in FIG. 6.

Figure 7:
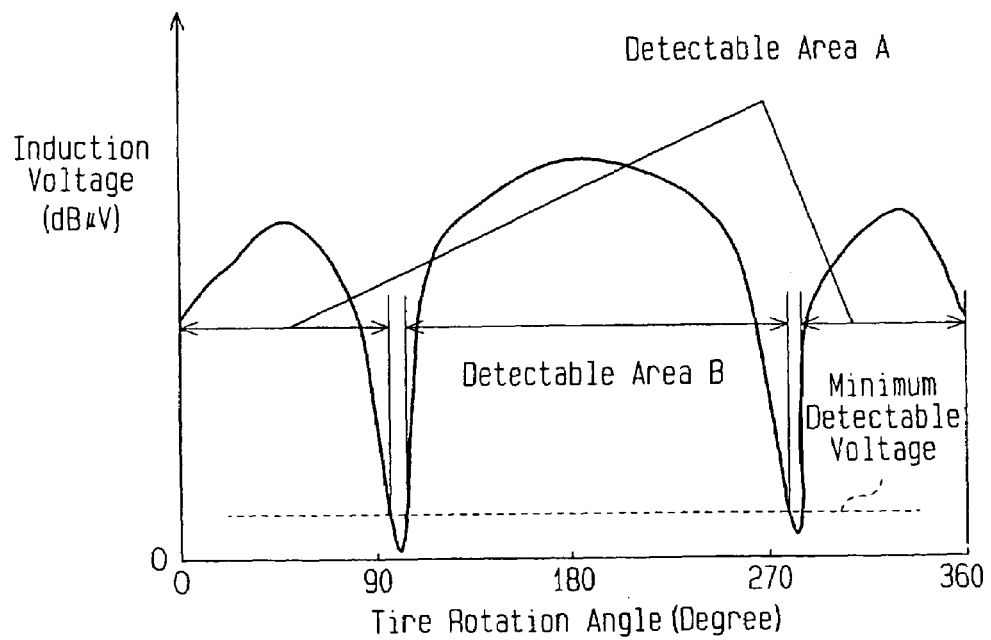
FIG. 7 is a graph illustrating the voltage induced from a receiving antenna during a single rotation of a tire.

Wireless radio waves of the transmitter 30 induce voltage in the receiving antenna 41. As shown in FIG. 7, the voltage (induction voltage) changes in accordance with the rotation angle of the tire 20. Here, the rotation angle of the tire 20 is defined as zero degrees when the transmitter 30 is closest to the ground, and the rotation angle of the tire 20 is defined as 180 degrees when the transmitter 30 is most distant from the ground. FIG. 7 illustrates the voltage induced in the receiving antenna when the tire 20 is rotated counterclockwise.

When the induced voltage is less that the minimum detectable voltage of the receiver 40, the receiver 40 cannot properly receive data from the transmitter 30. Tire rotation angles at which the induced voltage is less than the minimum detectable voltage are referred to as null points. The transmitter 30 obtains the rotation angle of the tire 20 from the magnetic field detection signal of the MI sensor 34 even at the null points. When the rotation angle of the tire 20 does not correspond to the null points, for example, when the rotation angle is in a range of 180°±60°, the transmitter 30 transmits data that is received by the receiver 40. Thus, data communication is ensured in the tire condition monitoring apparatus 1.

The graph of FIG. 7 was obtained through experiments. Thus, the graph of FIG. 7, that is, data indicating the relationship between the tire rotation angle and the induction voltage may be stored in the transmitter controller 31 of each transmitter 30, for example, in the ROM 31b or the RAM 31c. When storing data related with rotation angle ranges in the RAM 31c, the data may easily be corrected and changed.

The plurality of tires 20 are mounted on the vehicle 10 at different positions (front right side, front left side, rear right side, and rear left side). Further, the relationship between the rotation angle of each tire 20 and the induction voltage in addition to the rotation angle range that is optimal for wireless communication differs depending on the positions where the tires are mounted (FL, FR, RL, or RR). In the preferred embodiment, the layout of the permanent magnets 13 differs between the four wheel wells 12. For example, in the front left (FL) wheel well 12 shown in FIG. 5, the three permanent magnets 13 are arranged at positions corresponding to 90 degrees, 180 degrees, and 270 degrees. In the front right (FR) wheel well 12, the three permanent magnets 13 are arranged at positions corresponding to 90 degrees, 135 degrees, and 180 degrees. In the rear left (RL) wheel well 12, the three permanent magnets 13 are arranged at positions corresponding to 90 degrees, 225 degrees, and 270 degrees. In the rear right (RR) wheel well 12, the three permanent magnets 13 are arranged at positions corresponding to 90 degrees, 135 degrees, and 225 degrees. In this case, when the vehicle 10 moves and rotates the tires 20, the MI sensors 34 of the four transmitters 30 output magnetic field detection signals having different waveforms. The layout of the permanent magnets 13 enables the transmitter controller 31 to determine from the magnetic field detection signal of the MI sensor 34 where the transmitter 30 is located in the associated tire 20.

Figure 8:
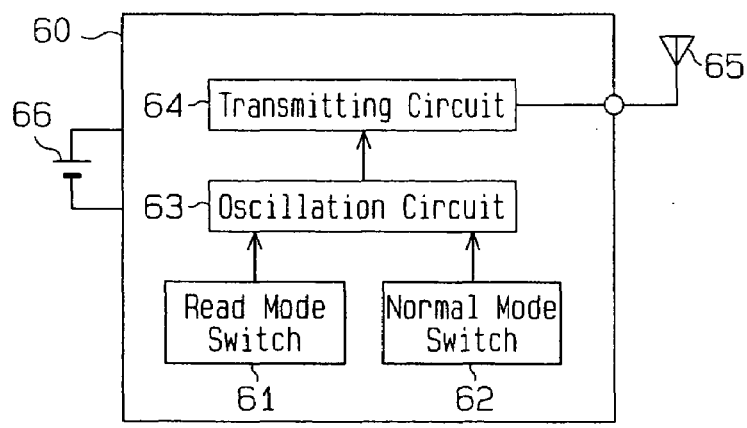
FIG. 8 is a block diagram showing a magnetic field generator.

A mode setting device 60 used to set the mode of the transmitter 30 will now be discussed with reference to FIG. 8.

The mode setting device 60 transmits a trigger signal for switching each transmitter 30 between a read mode and a normal mode. In the read mode, the transmitters 30 perform wireless transmission of the data in the rotation angle range that is optimal for wireless communication. In the normal mode, the transmitters 30 perform periodic data transmission of data indicating tire conditions.

The mode setting device 60 includes a first switch 61 for switching the transmitters 30 to the read mode and a second switch 62 for switching the transmitters 30 to a normal mode.

Figure 9A:
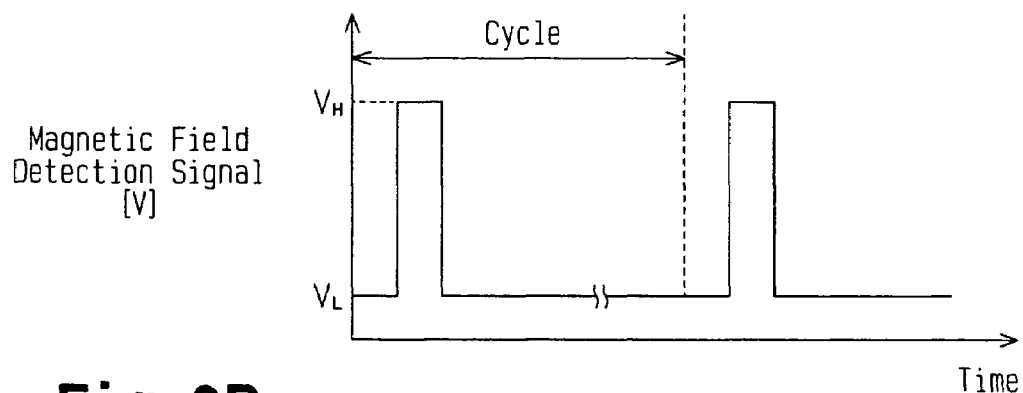
FIG. 9A is schematic diagram illustrating a magnetic field detection signal for setting a read mode.
Figure 9B:
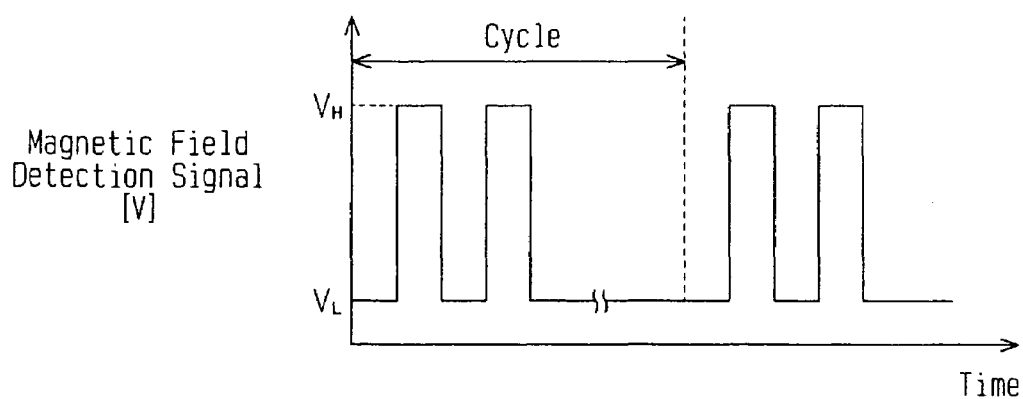
FIG. 9B is a schematic diagram illustrating a magnetic field detection signal for setting a normal mode.

In response to the operation of the first and second switches 61 and 62, an oscillation circuit 63 generates oscillation signals in order to switch modes. For example, when switching to the read mode, the oscillation circuit 63 generates an oscillation signal that causes the MI sensor 34 receiving the oscillation signal to generate a magnetic field detection signal having the waveform of FIG. 9A. When switching to the normal mode, the oscillation circuit 63 generates an oscillation signal that causes the MI sensor 34 receiving the oscillation signal to generate a magnetic field detection signal having the waveform of FIG. 9B. The transmitting circuit 64 modulates the oscillation signal to generate the trigger signal and transmit the trigger signal from the transmitting antenna 65. It is preferred that the mode setting device be portable.

The usage of the mode setting device 60 will now be described.

When mounting a tire 20 incorporating the transmitter 30 on the vehicle 10, the rotation angle range stored in the transmitter 30 must be checked. This is because the rotation angle range optimal for wireless communication changes in accordance with where the tire 20 is mounted on the vehicle 10.

Therefore, the person mounting the tire 20 to the vehicle 10 first holds the mode setting device 60 near the transmitter 30 and operates the first switch 61 before mounting a tire 20 on the vehicle 10. As a result, the mode setting device 60 performs wireless transmission of the trigger signal for reading the data of the rotation angle. In response to the trigger signal, the transmitter 30 shifts from the normal mode to the read mode. When entering the read mode, the transmitter 30 reads the data of the rotation angle range stored in the ROM 31b or the RAM 31c and transmits the read data to the receiver 40 in a wireless manner. The receiver 40 receives the data of the rotation angle range and shows the data on the display 50. Based on the data of the rotation angle shown on the display 50, the person mounting the tire 20 determines where to mount the tire 20 on the vehicle 10. Subsequently, the person mounting the tire 20 operates the second switch 62 to shift the transmitter 30 from the read mode to the normal mode.

The preferred embodiment has the advantages described below.

(1) The permanent magnets 13 are arranged in each wheel well 12, and each transmitter 30 includes the MI sensor 34, which detects external magnetic fields. When each tire 20 rotates, the relative position of the MI sensor 34 from the permanent magnets 13 changes in the associated wheel well 12. Further, the intensity of the magnetic fields generated by the permanent magnets 13 that is detected by the MI sensor 34 changes. Accordingly, the transmitter 30 determines the rotation angle of the tire 20 from the magnetic field detection signal generated by the MI sensor 34. Further, the transmitter 30 avoids the null points to transmit data in the optimum rotation angle ranges. This ensures that the receiver 40 receives data from the transmitter 30. Thus, the tire condition monitoring apparatus 1 performs data communication through a simple structure.

(2) The MI sensor 34 is a semiconductor magnetic sensor and does not have any mechanical, movable parts. Thus, even though the MI sensor 34 is arranged in the tire 20, which is subject to repetitive and strong vibrations, the MI sensor 34 hardly ever malfunctions and continuously maintains a high detection accuracy.

(3) The data related to the rotation angle of each tire 20 is stored in the ROM 31b or the RAM 31c of the associated transmitter controller 31. When the first switch 61 of the mode setting device 60 is operated, the transmitter 30 shifts from the normal mode to the read mode and transmits rotation angle range data to the receiver 40 in a wireless manner. Accordingly, the person mounting the tires 20 on the vehicle 10 may confirm the rotation angle range of each tire 20 with the receiver 40. For example, when there are a plurality of tires 20 incorporating the transmitters 30, the person mounting the tires 20 on the vehicle may select the tire 20 having the transmitter 30 that stores the desired rotation angle range.

(4) The layout of the permanent magnets 13 differs between the wheel wells 12. Thus, the waveforms of the magnetic field detection signals generated by the MI sensors 34 of the transmitters 30 differ from one another as the tires 20 rotate. This enables each transmitter controller 31 (transmitter 30) to determine the position of the transmitter 30 on the tire 20 based on the magnetic field detection signal waveform of the associated MI sensor 34.

(5) The permanent magnets 13 do not require electric power. Accordingly, the rotation angle of the tires 20 may be determined with a simple structure without draining the battery (not shown) of the vehicle 10.

It should be apparent to those skilled in the art that the present invention may be embodied in many other specific forms without departing from the spirit or scope of the invention. Particularly, it should be understood that the present invention may be embodied in the following forms.

The data related with the rotation angle that is optimal for wireless communication and corresponding to more than one tire 20 may be stored beforehand in the transmitter controller 31, for example, in the ROM 31b or the RAM 31c, of each transmitter 30. For instance, the data related with the rotation angle that is optimal for wireless communication and corresponding to each of the tires 20 may be stored beforehand in the transmitter controller 31, for example, in the ROM 31b or the RAM 31c, so that the transmitter 30 always transmits the data of the optimal rotation angle range even when changing the mounting positions of the tires.

Based on the magnetic detection signal of the MI sensor 34, each transmitter 30 determines the mounting position of the associated tire 20 on the vehicle 10. Then, based on the determined mounting position of the tire 20, the transmitter 30 determines the rotation angle range optimal for wireless communication from the rotation angle range stored in the ROM 31b or the RAM 31c. The transmitter 30 transmits the data of the determined optimum rotation angle range to the receiver 40. Accordingly, even if the mounting position of the tire 20 relative to the vehicle 10 is changed, the transmitter 30 transmits data to the receiver 40 in the optimum rotation angle. Further, the data of the rotation angle range stored in the transmitter 30 does not have to be read with the mode setting device. Thus, in this case, the mode setting device 60 is not required.

The mode setting device 60 may be provided with a receiving circuit for receiving data from each transmitter 30 and a display for displaying the received data. In this case, in response to a trigger signal generated by the mode setting device 60, the mode setting device 60 may receive the rotation angle range data stored in the transmitter with the receiving circuit and display the data on the display. This enables the rotation angle range to be viewed on the mode setting device 60.

After operating the first switch 61 of the mode setting device 60, the rotation angle range data may be transmitted to the receiver 40 a predetermined number of times. Then, the normal mode may automatically be entered. In such a structure, the second switch 62 may be eliminated. Further, after the rotation angle range data is transmitted to the receiver 40, the mode may automatically be switched to the normal mode.

A magnetoresistance sensor, a Hall sensor, a flux gate sensor, or a coil may be used in lieu of the MI sensor 34.

Electromagnets can be used in lieu of the permanent magnets 13

The number of the permanent magnets 13 arranged in each wheel well 12 of the vehicle 10 is not limited to three as long as there is one or more. In other words, as long as there is at least one permanent magnet 13 in each wheel well 12, the rotation angle of the tire 20 may be determined.

When the permanent magnets 13 have different electric field intensities (levels), one or more of the permanent magnets 13 may be arranged in each wheel well 12 of the vehicle 10. This enables the rotation angle of the associated tire 20 to be determined based on the level of the electric field detection signal from the MI sensor 34 and enables the mounting position of the tire 20 to be determined 20.

The layout of two or more permanent magnets 13 in each wheel well 12 may differ from the layout of two or more permanent magnets 13 in each of the remaining wheel wells 12. This also enables the rotation angle of each tire 20 to be determined from the layout of the associated permanent magnets 13 and enables the mounting position of the tire 20 to be determined.

The number of the permanent magnets 13 in each wheel well 12 may differ from the number of permanent magnets 13 in other wheel wells 12. This also enables the rotation angle of the tire to be determined from the number of the associated permanent magnets 13 and enables the mounting position of the tire 20 to be determined.

The size (length in the rotating direction of the tire 20) of the permanent magnets 13 in each wheel well 12 may differ from the size of the permanent magnets 13 in the other wheel wells 12. This also enables the rotation angle of the tire to be determined from the time during which electric fields are detected and enables the mounting position of the tire 20 to be determined.

The positions of the permanent magnets 13 may be changed. In such a case, when determining the rotation angle of the tire 20 and determining the mounting position of the tire 20 relative to the vehicle 10, the permanent magnets 13 must be arranged at different positions in each of the wheel wells 12.

The permanent magnets 13 may be arranged at positions other than in the wheel wells 12, for example, at positions near each tire 20. More specifically, the permanent magnets 13 may be arranged at positions on a side spoiler, a front spoiler, a rear spoiler, a bumper, or a mudguard.

The measuring interval is not limited to 15 seconds and may be changed, for example, in accordance with the type of the tire 20 in which the transmitter 30 is incorporated.

The power supply from the battery 37 to the pressure sensor 32, the temperature sensor 33, the MI sensor 34, and the transmitting circuit 35 may be stopped at periods other than the measuring time t2 and the transmission time t3. This further prolongs the life of the battery 37.

The number of times the pressure sensor 32 and the temperature sensor 33 perform measurements is 40 in the preferred embodiment and used to determine whether the transmission interval t4 has elapsed. However, this number may be changed to one other than 40.

A warning device may generate an audible warning when the air pressure or temperature of a tire 20 is abnormal. In addition, a speaker installed in the vehicle 10 may be used to function as a warning device.

The temperature sensor 33 may be eliminated. In such a case, the transmitter 30 is provided with only the minimal functions. This reduces the cost of the transmitter 30.

The air pressure information transmitted from the transmitter 30 may be data specifically indicating the value of the air pressure or data that simply indicates that the air pressure is included in a tolerable range.

The application of the present invention is not limited to a four-wheel vehicle. More specifically, the present invention may be applied to a bicycle, a motorcycle, a bus with multiple wheels, a tractor trailer, or an industrial vehicle (e.g., forklift) provided with tires 20. When applying the present invention to a tractor trailer, the receiver 40 and the display 50 are arranged in the tractor.

In this specification, the phrase measurement or transmission at predetermined time intervals and the phrase periodic measuring or transmission indicate conditions in which the measuring intervals or transmission intervals are substantially the same although slight changes in the intervals are tolerated.

The present examples and embodiments are to be considered as illustrative and not restrictive, and the invention is not to be limited to the details given herein, but may be modified within the scope and equivalence of the appended claims.

What is claimed is:

1. A tire condition monitoring apparatus for monitoring the condition of a tire of a vehicle, the tire condition monitoring apparatus comprising;
   a transmitter arranged in the tire;
   a receiver for performing wireless communication with the transmitter;
   a magnetic field generator arranged in the vehicle near the tire to generate a magnetic field; and
   a magnetic field detector arranged in the transmitter to detect the magnetic field, wherein the transmitter determines rotation angle of the tire in accordance with the detection of the magnetic field detector to transmit data indicating the condition of the tire based on the rotation angle.

2. The tire condition monitoring apparatus according to claim 1, wherein:
   the tire is one of a plurality of tires, the transmitter is one of a plurality of transmitters, each being arranged in one of the plurality of tires, and the magnetic field generator is one of a plurality of magnetic field generators, each being arranged in one of the plurality of tires;
   the plurality of magnetic field generators are arranged so that each of the magnetic field detectors generates a magnetic field detection signal when the associated tire is rotating, the magnetic field detection signals having different waveforms or levels from each other;
   each of the transmitters determines a mounting position of the associated tire based on the magnetic field detection signal received from the associated magnetic field detection device, each of the transmitters determines the rotation angle of the tire that is optimal for wireless communication in accordance with the mounting position of the associated tire, and each of the transmitters transmits data indicating the condition of the tire when the rotation angle of the associated tire is substantially the same as the optimum rotation angle.

3. The tire condition monitoring apparatus according to claim 2, wherein each of the magnetic field generators includes a plurality of magnetic field generating elements arranged in a wheel well of the vehicle, the magnetic field generating elements of one of the magnetic field generators being laid out differently from the magnetic field generating elements of the other magnetic field generators.

4. The tire condition monitoring apparatus according to claim 2, wherein each of the transmitters includes:
   a storage device for storing data of rotation angle ranges that are optimal for wireless communication in accordance with the mounting positions of the plurality of tires, and each of the transmitters determines the mounting position of the associated tire based on the magnetic field detection signal received from the associated magnetic field detection device, wherein each of the transmitters determines the optimum rotation angle of the tire of which mounting position has been determined from the data stored in the storage device, and wherein each of the transmitters transmits data indicating the condition of the associated tire when the rotation angle of the associated tire is in the optimum rotation angle range.

5. The tire condition monitoring apparatus according to claim 1, wherein the transmitter includes a storage device for storing data of a rotation angle range that is optimal for wireless communication, the transmitter transmitting data indicating the condition of the tire when the detected rotation angle of the tire is in said rotation angle range.

6. The tire condition monitoring apparatus according to claim 5, wherein the storage device is re-writable.

7. The tire condition monitoring apparatus according to claim 5, wherein the magnetic field detector is a coil sensor or a semiconductor sensor.

8. The tire condition monitoring apparatus according to claim 1, wherein the magnetic field generator includes a permanent magnet.

9. The tire monitoring apparatus according to claim 1, wherein the magnetic field detector includes an electromagnet.

10. The tire condition monitoring apparatus according to claim 1, further including an informing device connected to the receiver to inform a passenger of the vehicle of the condition of the tire.

11. The tire condition monitoring apparatus according to claim 1, wherein the receiver includes a receiving antenna for receiving a wireless signal of the transmitter, and the transmitter generates a wireless radio wave for generating induction voltage in the receiving antenna, transmits data indicating the condition of the tire when the rotation angle of the tire is not in a range in which the induction voltage becomes less than a minimum detectable voltage of the receiver.

12. A tire condition monitoring apparatus for monitoring the condition of a plurality of tires, each accommodated in one of a plurality of wheel wells of a vehicle, the tire condition monitoring apparatus comprising;
   a transmitter arranged in each tire to generate a wireless radio wave;
   a receiver arranged in the vehicle to perform wireless communication with each transmitter, the receiver including a receiving antenna for receiving the wireless radio wave of each transmitter, and the wireless radio wave causing an induction voltage to be generated in the receiving antenna;

a plurality of permanent magnets fixed at a plurality of positions in each wheel well; and a magnetic field detector arranged in each transmitter for detecting a magnetic field that acts on the transmitter;

wherein each transmitter detects the rotation angle of the associated tire in accordance with the detection of the associated magnetic field detector, and each transmitter transmits data indicating the condition of the tire when the rotation angle of the tire is in a predetermined range that is not in a range in which the induction voltage becomes less than a minimum detectable voltage of the receiver.

13. The tire condition monitoring apparatus according to claim 12, wherein the plurality of wheel wells includes a first wheel well and a second wheel well, the permanent magnets of the first wheel well being laid out differently from the permanent magnets of the second wheel well.

14. The tire condition monitoring apparatus according to claim 13, wherein the number of the permanent magnets in the first wheel well is the same as the number of permanent magnets in the second wheel well.

15. The tire condition monitoring apparatus according to claim 14, wherein the permanent magnets of the first wheel well are arranged at first angular intervals, and the permanent magnets of the second wheel well are arranged at second angular intervals.

16. A method for monitoring a tire condition in a vehicle including a tire mounted in a wheel well, the method comprising:

arranging a transmitter in the tire to generate a wireless radio wave;

arranging a receiver in a vehicle for performing wireless communication with the transmitter, with the receiver including a receiving antenna for receiving the wireless radio wave of the transmitter by the wireless radio wave causing an induction voltage to be generated in the receiving antenna;

fixing a plurality of permanent magnets at a plurality of positions in the wheel well;

arranging a magnetic field detector in the transmitter for detecting a magnetic field that acts on the transmitter;

determining the rotation angle of the tire at which the induction voltage becomes less than a minimum detectable voltage of the receiver;

detecting the rotation angle of the tire in accordance with the detection of the magnetic field detector;

transmitting data indicating the condition of the tire when the rotation angle of the tire is in a predetermined range that excludes the determined rotation angle; and receiving the data and displaying the condition of the tire in accordance with the received data.

17. An apparatus for monitoring the condition of a tire mounted in a wheel well of a vehicle, the apparatus comprising:

a plurality of permanent magnets fixed to the wheel well;

a transmitter fixed to the tire and including a pressure sensor for detecting the air pressure of the tire, a magnetic impedance sensor for detecting electric fields generated by the plurality of permanent magnets, and a transmitter controller for determining rotation angle of the tire based on the detection of the magnetic impedance sensor and for transmitting air pressure data generated by the pressure sensor when the rotation angle of the tire is in a range optimal for wireless communication; and a receiver arranged in the vehicle to receive the air pressure data.

* * * * *